Figure 1:
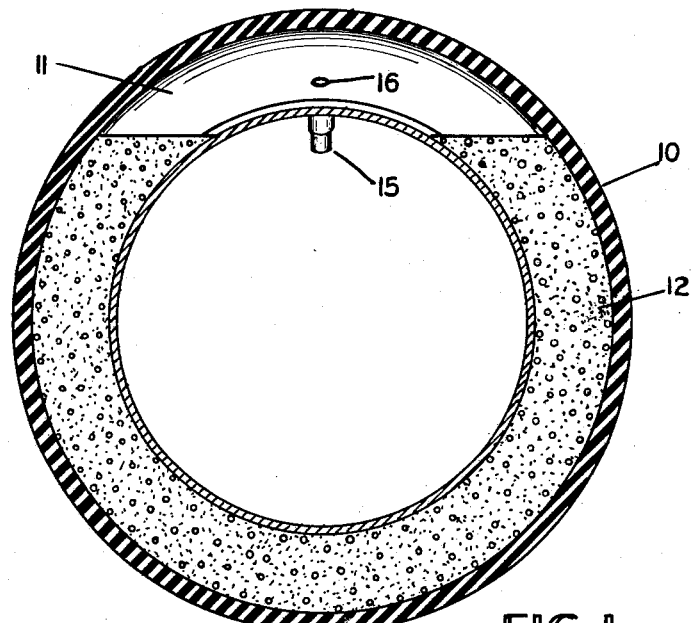

INVENTORS
FISHER W. CULBERSON
WILLIAM L. HICKS

United States Patent Office 3,003,536
Patented Oct. 10, 1961

3,003,536
VEHICLE TIRE BALLAST
Fisher W. Culberson and William L. Hicks, Boulder, Colo., assignors to Led Ballast, Inc., Boulder, Colo., a corporation of Colorado
Filed June 13, 1960, Ser. No. 35,413
13 Claims. (Cl. 152—330)

This invention relates to ballast for vehicle tires and more particularly is directed to ballasted pneumatic tires, the dry ballast for such tires, and the method of making same.

The invention represents improvements over United States Patent No. 2,884,039 for "Vehicle Tire Ballast," and copending application Serial No. 797,476, filed March 5, 1959 for "Pneumatic Tire Ballast." In the foregoing, there is disclosed pneumatic tires filled with a dry ballast material that when settled fills 80–97% of the tire, whereas when agitated as by rolling the tire, the dry ballast completely fills the tire with a live weight, preventing loping, vibration or other undesirable movements and actions as the vehicle upon which the tire is mounted, moves. The ballast of the instant invention is usable in essentially the same manner as the said disclosed dry tire ballast.

In using the ballast of the said application and patent, certain difficulties arose when used under conditions of high humidity and moisture. Under certain conditions occluded moisture found in the dry mineral ballast induced a corrosive action on the rims and other metal parts of the tire with which the powder came in contact. This was particularly true when the ballast was used with tubeless tires where the powder is in direct contact with the rim. For example, in an earthmover tire which contains about two thousand pounds of dry mineral ballast, at only about 1% of occluded moisture, the material contains about twenty pounds of water. In the operation of the vehicle and ballasted tires, the ballast warms due to atmospheric conditions and the friction of the tire on the operating surface, as well as the heat generated by the flexing of the tire walls upon rolling. When so heated, the occluded moisture vaporized and came into contact with the metal rim which being metal was much cooler than the rubber tire. Thus, there was a tendency of the water vapor to condense upon the metal rim which condensation further cooled the rim causing additional condensation and promoted rust conditions. In cases of two piece tubeless tire rims, the foregoing described rusting has in some instances become so severe that it was extremely difficult to remove and separate the parts of the rim after the corrosive action had proceeded.

Mineral ballast according to the instant invention effectively overcomes the foregoing difficulties, as well as providing a superior ballasting material. Ballast according to this invention is more free flowing due to inherent lubrication of each of the minute particles relative to others. Furthermore, it has been discovered that with this ballast material considerably less ballast may be required to effectively accomplish a 100% fill, useful condition upon agitation and rolling movement of the vehicle and tires.

We have discovered that minerals with a surface coating of a metallic soap or long chain fatty acid effectively reduces and substantially eliminates the above described release of occluded moisture, as well as accomplishing the other above discussed desirable results. The long chain fatty acids are preferably high molecular weight acids and the metal salts thereof, i.e. 10–31 carbon atom chains. The determining characteristic is that there be a material which will readily provide an insoluble coating on the materials during grinding. With finely divided limestone, for example, we have discovered that by mixing about four pounds per ton of a fatty acid, such as stearic acid, with the limestone, and subjecting the mixture to a heat treatment at about 150° F. that a finely divided product coated with stearic acid and salts thereof is produced which readily repels moisture.

Another preferred acid is palmitic acid. In the use of palmitic acid, we mix up to 5% of a finely divided lime to about 95% of a metallic powdered mineral, such as diatomaceous earth. This mixture, when heated with four pounds of palmitic acid, provides a mineral mixture which exhibits a surface coated with a calcium soap of the long chain fatty acid and/or other salts. This coated mineral readily repels moisture and retains occluded moisture.

We have discovered that the foregoing powdered mineral, when coated with metallic soap, flows much more readily than previous ballasts and appears to absorb air much more readily upon movement or rolling of the tire.

A tire containing a powder mineral ballast according to Patent No. 2,884,039 operates smoothly when rolling because the mineral absorbs or mixes with the air in the tire. A tire which is about 85% full of powder according to the patent in its settled or compacted form, effectively and substantially fills the tire when the powder is aerated by rotation. A tire filled with the coated ballast according to the instant invention may be filled to as little as 65% of capacity in the same manner as described in the said patent, and when rotated exhibits the 100% full condition.

It is thus among the objects and advantages of the instant invention to provide an inexpensive mineral ballast material for pneumatic tires; which is readily aerated upon rotation of a pneumatic tire; repels moisture; and rapidly assumes an aerated condition upon rotation of the tire.

Figure 2:
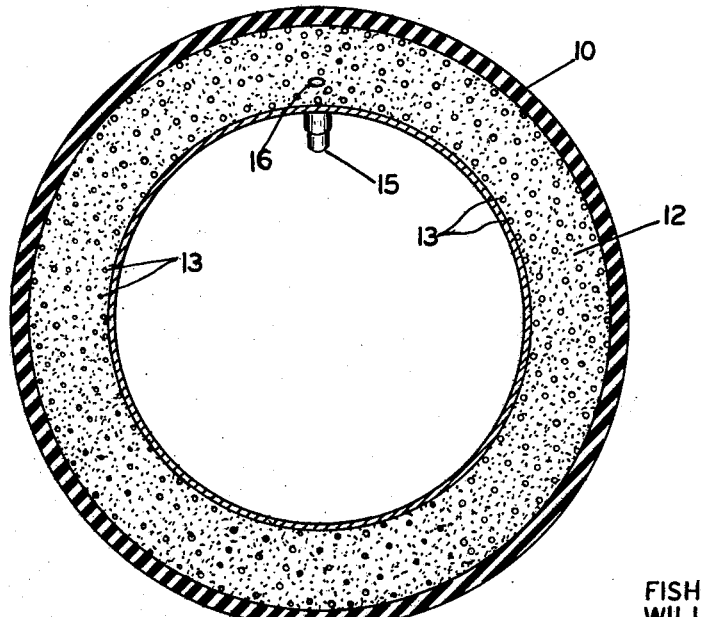

It is a further object of the invention to provide a coated powder mineral which increases as much as 35% in effective volume upon rotation of a pneumatic tire in which it is incorporated. Other objects and advantages may be ascertained by the following description with reference to the appended illustration in which:

FIG. 1 is a vertical cross-sectional view of a tire partially filled with settled ballast; and FIG. 2 is a similar vertical cross-sectional view of the tire in FIG. 1, showing the ballast after it has been rotated several times to agitate it with the air in the tire.

In the illustration, a pneumatic rubber tire 10 provides an annular chamber having at the upper portion thereof an air space 11. The remainder of the chamber is filled with a dry particulate ballast 12 according to the instant invention and having larger particles or granular material 13 intermixed with finer particles. The rubber tire 10 is shown to be supported on a rim having a valve 15 opening therethrough and into the annular chamber 11 by opening 16.

In FIG. 1 the ballast is shown in settled condition, that is, where the particulate mass contains only a minimum quantity of occluded air, and this settled material is quite solid to the feel. This condition is approached by tapping the tire with a hammer to permit the occluded air to pass up through the mass 12 into the top part of the chamber 11. A tire containing coated ballast material according to this invention may be filled to as little as 65% volume capacity of the tire in this settled condition; and upon revolution, the ballast will become airborne to substantially fill the tire to about 100% of its volume.

In one actual test, a ballast mixture was prepared using 200 mesh barium sulfate (i.e. all material passing a 200 mesh screen, Tyler screen sizes), 20 mesh iron ore as monazite sand, stearic acid and calcium carbonate. By weight percent, the mixture is about 50% barium sulfate, 49.0% iron ore, 0.2% stearic acid and 0.8% calcium carbonate. The foregoing mixture was heated to about 200° F. with agitation and attrition. The resulting mixture was observed to effectively repel droplets of moisture. This mixture was then used to fill a 12 x 28 tractor tire and resulted in an effective weight in the tire of about 28 pounds per gallon of tire capacity. The tire containing the mixture had characteristics indicating that the ballast readily fluffed and filled the tire to its 100% capacity during rotation, whereas only about 65% of the volume of the tire had been filled with our new powdered ballast mixture, based on the settled density of the material.

Comparing the ballast of the instant invention with the ballast of the above-mentioned patent and copending application, the settled density of the mineral mixtures was determined by compaction in a graduate cylinder, by the method described in the copending application Serial No. 797,476. Using the observed settled density and the true volume capacity of the tire as measured by filling with water, it is possible to fill a tire carefully to a desired level of its true capacity. It was observed that a tire filled to only 75% of its volume capacity with a mineral mixture according to the previous teachings, which had not been treated with a fatty acid or metallic soap thereof, was difficult to balance upon turning. This indicated that the mineral had not fluffed or increased its volume sufficiently within the tire to effectively fill it upon rotation. When the same tire was observed filled to the 75% capacity with the coated mineral, the tire became readily balanced upon rotation, indicating that the powder had mixed with air.

Using the foregoing methods of testing, an earth mover tubeless tire was filled with powdered barium sulfate and talc in a blend of about 50% each by weight. During this filling operation, moisture was added to powder to bring its moisture content up to about 2.0% by weight in the total mixture. The tire was operated for several months in earth moving operations and at times the tire and ballast became heated to about 150° F. Cooling by the metal rim caused the moisture within the tire ballast to condense on the rim as described above. After the ballast was removed, difficulty was encountered in removing the tubeless rim due to a definite rusting condition which had formed between the two closely fitting surfaces of the split rim assembly. Several similar types of tubeless tires were filled with barium sulfate which had been treated with a metallic soap or long chain fatty acid as described above, i.e. using about four pounds of fatty acid per ton of mineral. This material was installed in the same type of tire and tested over a time period similar to the above. The material showed no tendency to pack under the bead seat band of the tubeless rim, nor was any rusting of the metal parts encountered. The foregoing mixture resulted in an effective tire weight of about 15 pounds per gallon of tire capacity.

In another test, a 26 x 5-25 earth mover tire was filled with a dry powdered ballast comprising 90% limestone and 10% talc by weight ground to a fine powder analyzing 90% minus 200 mesh. After filling the tire cavity the tire was inflated to a pressure of twelve pounds per square inch. Difficulty was encountered in getting air to enter the tire through the valve due to moisture which entered the valve from the compressed air source. Furthermore, the moisture prevented accurate measurement of pressure in the tire. A second 26 x 5-25 tire was filled with a powdered ballast similar to the above but which had been conditioned with about four pounds of stearic acid per ton of material during the grinding operation as described above. Using such a coated mineral powder, no difficulty was entailed in filling the tire or testing the air pressure and no moisture was observable in the treated material. The foregoing resulted in an effective tire weight of about twelve pounds per gallon of tire capacity.

In still another example of this invention, a ballast was prepared containing 90% limestone ground to 60% minus 200 mesh and 40% minus 50 mesh. The foregoing was mixed with 10% by weight of diatomaceous earth analyzing 200 mesh. The foregoing was placed in vehicle tires and later removed therefrom when extra weight was not needed in the tires. Humidity conditions have previously made storage of such removed powdered ballast difficult since it tended to lump due to atmospheric moisture. With the new ballast material according to the instant invention, which had been treated with about four pounds per ton of long chain fatty acids, no lumping was encountered and the material was easily reused. The foregoing mixture resulted in an effective tire weight of about ten pounds per gallon of tire capacity.

Thus, a preferred mode of manufacturing a dry powder ballast according to this invention comprises mixing the dry ingredients in the desired weight percent and subjecting it to a grinding operation in an atmosphere heated to about 150–200° F. with agitation. The foregoing mixture had added thereto about four pounds per ton of a long chain fatty acid, such as palmitic acid, or a metal soap.

While we have described the practice of the invention with regard to certain long chain fatty acids such as stearic and palmitic and the calcium salts thereof, we do not desire to be limited thereby since, as pointed out above, the guiding characteristics are that the long chain fatty acid and/or salts thereof form a water repellant coating on the mineral components of the powdered ballast.

Furthermore, by proper selection of the ballast ingredients, i.e. the powdered material, a variation in the effective weight of a given tire is possible. For example, the 28 pound per gallon mixture could be substituted for the 10 pound per gallon mixture in a given tire thereby changing the effective density and the weight of that tire.

Therefore, having described our invention and the manner of practicing it, what we desire to have protected by Letters Patent is set forth in the following claims.

We claim:

1. A ballasted vehicle tire, comprising a resilient vehicle tire having an annular sealed chamber inflatable with gas under pressure, a particle ballast partially filling said chamber to not less than about 65% of its capacity when the tire is at rest, and leaving a void of not more than about 35% at the top of the tire, a gas maintained in said chamber under pressure to inflate said tire and to provide a pneumatic tire capable of flattening under heavy pulling loads, said ballast containing finely reduced powdered mineral material surface coated with a compound selected from the group comprised of long chain fatty acids of 10-31 carbon atom chain, the mineral salts of said acids, and mixtures thereof, the amount of finely reduced powder being sufficient that during rotation of the tire the ballast is entrained in the enclosed gas substantially filling the volume of the tire with a densified, compressible pneumatic medium for the tire.

2. A ballasted vehicle tire comprising a resilient vehicle tire having an annular sealed chamber inflatable with gas under pressure, a particle ballast partially filling said chamber to not less than about 65% of its capacity when the tire is at rest and leaving a void of not more than about 35% at the top of the tire, a gas maintained in said chamber under pressure to inflate said tire and to provide pneumatic tire capable of flattening out under heavy pulling loads, said ballast containing a finely reduced mineral powdered ballast material surface coated with an insoluble material in the amount of about four pounds per ton, said insoluble material being a long chain fatty acid of about 10-31 carbon atoms and the salts thereof, and the amount of fine powder being sufficient that during rotation of the tire the ballast is entrained in the enclosed gas substantially filling the volume of the tire with a densified, compressible pneumatic medium for the tire.

3. A ballasted vehicle tire comprising a resilient vehicle tire having an anular sealed chamber inflatable with gas under pressure, a particle ballast partyially filling said chamber to not less than about 65% of its capacity when the tire is at rest and leaving a void of not more than about 35% at the top of the tire, a gas maintained in said chamber under pressure to inflate said tire and to provide a pneumatic tire capable of flattening out under heavy pulling loads, said ballast being a mixture of granular and powdered minerals coated with an insoluble metallic soap in an amount of about four pounds per ton of ballast material, and the amount of fine powder being sufficient that during rotation of the tire the ballast is entrained in the enclosed gas substantially filling the volume of the tire with a densified, compressible pneumatic medium for the tire.

4. A ballasted vehicle tire comprising a resilient vehicle tire having an annular sealed chamber inflatable with gas under pressure, a particle ballast partially filling said chamber when the tire is at rest leaving a void of not more than about 35% at the top of the tire, a gas maintained in said chamber under pressure to inflate said tire and to provide a pneumatic tire capable of flattening out under heavy pulling loads, said ballast being a mixture of about 5% by weight of the finely powdered limestone and about 95% by weight of another metallic powdered mineral, the surfaces of the particles of said mixture having an insoluble coating as a result of being treated with about four pounds pera ton of a fatty acid selected from the group comprised of fatty acids having 10-31 carbon atom chains, and the amount of the fine powder being sufficient that during rotation of the tire the ballast is entrained in the enclosed gas substantially filling the volume of the tire with a densified, compressible pneumatic medium for the tire.

5. The tire of claim 4 in which the long chain fatty acid is palmitic acid.

6. The tire of claim 4 in which the long chain fatty acid is stearic acid.

7. A ballasted vehicle tire comprising a resilient vehicle tire having an annular sealed chamber inflatable with gas under pressure, a particle ballast partially filling said chamber to not less than about 65% of its capacity when the tire is at rest, a gas maintained in said chamber under pressure to inflate said tire and to provide a pneumatic tire capable of flattening out under heavy pulling loads, said ballast comprising a mixture of about 5% by weight of a finely powdered limestone and about 95% by weight of diatomaceous earth, the particles of said mixture being coated with an insoluble material selected from the group consisting of a long chain fatty acid selected from the group containing 10-31 carbon atom chains, the mineral salts of such acids, and mixtures thereof, and the amount of the fine powder being sufficient that during rotation of the tire the ballast is entrained in the enclosed gas substantially filling the volume of the tire with a densified, compressible pneumatic medium for the tire.

8. A ballasted vehicle tire comprising a resilient vehicle tire having an annular sealed chamber inflatable with gas under pressure, a particle ballast partially filling said chamber to not less than about 65% of its capacity when the tire is at rest, a gas maintained in said chamber under pressure to inflate said tire and to provide a pneumatic tire capable of flattening out under heavy pulling loads, said ballast comprising a mixture of about 50% by weight of 200 mesh barium sulfate, about 49.0% by weight of 20 mesh iron ore, about 0.2% by weight of stearic acid and about 0.8% by weight of calcium carbonate, said mixture having been agitated and heated to the range of about 150-200° F. to form an insoluble coating on the particles of the mixture, and the amount of the mineral entrained in the tire being sufficient that during rotation of the tire the ballast is entrained in the enclosed gas substantially filling the volume of the tire with a densified, compressible pneumatic medium for the tire.

9. A ballasted vehicle tire comprising a resilient vehicle tire having an annular sealed chamber inflatable with gas under pressure, a particle ballast partially filling said chamber to not less than about 65% of its capacity when the tire is at rest, leaving a void of not more than about 35% at the top of the tire, a gas maintained in said chamber under pressure to inflate said tire and to provide a pneumatic tire capable of flattening out under heavy pulling loads, said ballast comprising a mixture of about 50% by weight of powdered barium sulfate and about 50% by weight of talc, said mixture having been treated with a long chain fatty acid selected from the group having 10-31 carbon atoms under agitation and heating to the range of about 150-200° F. to provide an insoluble surface coating on the mineral products of said mixture, and the amount of fine powder being sufficient that during rotation of the tire the ballast is entrained in the gas substantially filling the volume of the tire with a densified, compressible pneumatic medium for the tire.

10. A ballasted vehicle tire comprising a resilient vehicle tire having an annular sealed chamber inflatable with gas under pressure, a particle ballast partially filling said chamber when the tire is at rest and leaving a void of not more than about 35% at the top of the tire, a gas maintained in said chamber under pressure to inflate said tire and to provide a pneumatic tire capable of flattening out under heavy pulling loads, said ballast comprising a mixture of about 90% by weight of limestone and about 10% by weight of talc ground to a fine powder and analyzing 90% minus 200 mesh, said mixture having been treated with about four pounds per ton of a composition selected from the group consisting of a long chain fatty acid selected from the group having from 10 to 31 carbon atoms, the mineral salts of said acids, and mixtures thereof, and the amount of fine powder being sufficient that during rotation of the tire the ballast is entrained in the enclosed gas substantially filling the volume of the tire with a densified, compressible pneumatic medium for the tire.

11. The tire of claim 10 in which the long chain fatty acid is palmitic acid.

12. The tire of claim 10 in which the long chain fatty acid is stearic acid.

13. A ballasted vehicle tire comprising a resilient vehicle tire having an annular sealed chamber inflatable with gas under pressure, a particle ballast partially filling said chamber when the tire is at rest and leaving a void of about 35% at the top of the tire, a gas maintained in said chamber under pressure to inflate said tire and to provide a pneumatic tire capable of flattening out under heavy pulling loads, said ballast comprising about 90% by weight of limestone ground to about 60% minus 200 mesh and about 10% by weight of diatomaceous earth analyzing about 100% minus 200 mesh, said mixture having been treated with a long chain fatty acid selected from the group having from 10-31 carbon atom chain and being agitated therewith while subjected to a heating of from about 150 to about 200° F. to thereby form an insoluble coating of said acid and the mineral salts thereof on the surface of said particles, and the amount of the fine powder being sufficient that during rotation of the tire the ballast is entrained in the enclosed gas substantially filling the volume of the tire with a densified, compressible pneumatic medium for the tire.

References Cited in the file of this patent

UNITED STATES PATENTS 2,884,039   Hicks _____ Apr. 28, 1959